United States Patent [19]

Tsuboi

[11] 4,427,088
[45] Jan. 24, 1984

[54] POWER UNIT APPARATUS FOR MOTORCYCLES

[75] Inventor: Masaharu Tsuboi, Sayama, Japan

[73] Assignee: Honda Giken Kogyo Kabushiki Kaisha, Tokyo, Japan

[21] Appl. No.: 369,791

[22] Filed: Apr. 19, 1982

[30] Foreign Application Priority Data

Apr. 20, 1981 [JP] Japan .................. 56-56800[U]

[51] Int. Cl.³ .............................................. B62D 61/02
[52] U.S. Cl. .............................. 180/219; 74/606 R;
74/359; 180/226; 180/229; 180/230
[58] Field of Search ............... 180/219, 226, 229, 230;
74/606 R

[56] References Cited

U.S. PATENT DOCUMENTS 4,265,330  5/1981  Silk et al. .......................... 180/230
4,339,964  7/1982  Isaka ............................... 74/606 R

FOREIGN PATENT DOCUMENTS 182046  5/1955  Austria .............................. 180/226
735618  8/1955  United Kingdom ............... 180/226

Primary Examiner—Joseph F. Peters, Jr.
Assistant Examiner—Kenneth R. Rice
Attorney, Agent, or Firm—Lyon & Lyon

[57] ABSTRACT

Power unit apparatus for a motorcycle driven by an internal combustion engine has a split power unit case. The crankshaft and the driving shaft of a reduction gear mechanism are clamped between the upper and lower sections of the power unit case. The driven shaft is located on the lower section. A guide shaft for shifter forks and a shift drum controlling operation of the shifter forks are both located on the upper section above the driving and driven shafts.

3 Claims, 4 Drawing Figures

POWER UNIT APPARATUS FOR MOTORCYCLES

This invention relates to a power unit apparatus for a motorcycle, which is enabled to have its length reduced and to remarkably improve its lubrication characteristics.

In a known motorcycle, generally speaking, the crankcase and transmission case of an internal combustion engine cooperate to form a power unit case. A drum actuated type of gear reduction mechanism is mounted to drive a counter shaft associated with the rear wheel from a main shaft associated with the engine, at any one of several gear ratios. The present invention has a main object to provide a power unit apparatus of the aforementioned type for a motorcycle, which apparatus is enabled to have its power unit case shortened in the longitudinal direction and to improve its lubricating features. This is accomplished by the novel arrangements of the main shaft, the counter shaft, the guide shaft for the shift forks, and the shift drum for the drum actuated type of gear reduction mechanism.

Other objects and advantages will appear hereinafter.

IN THE DRAWINGS

Figure 1:
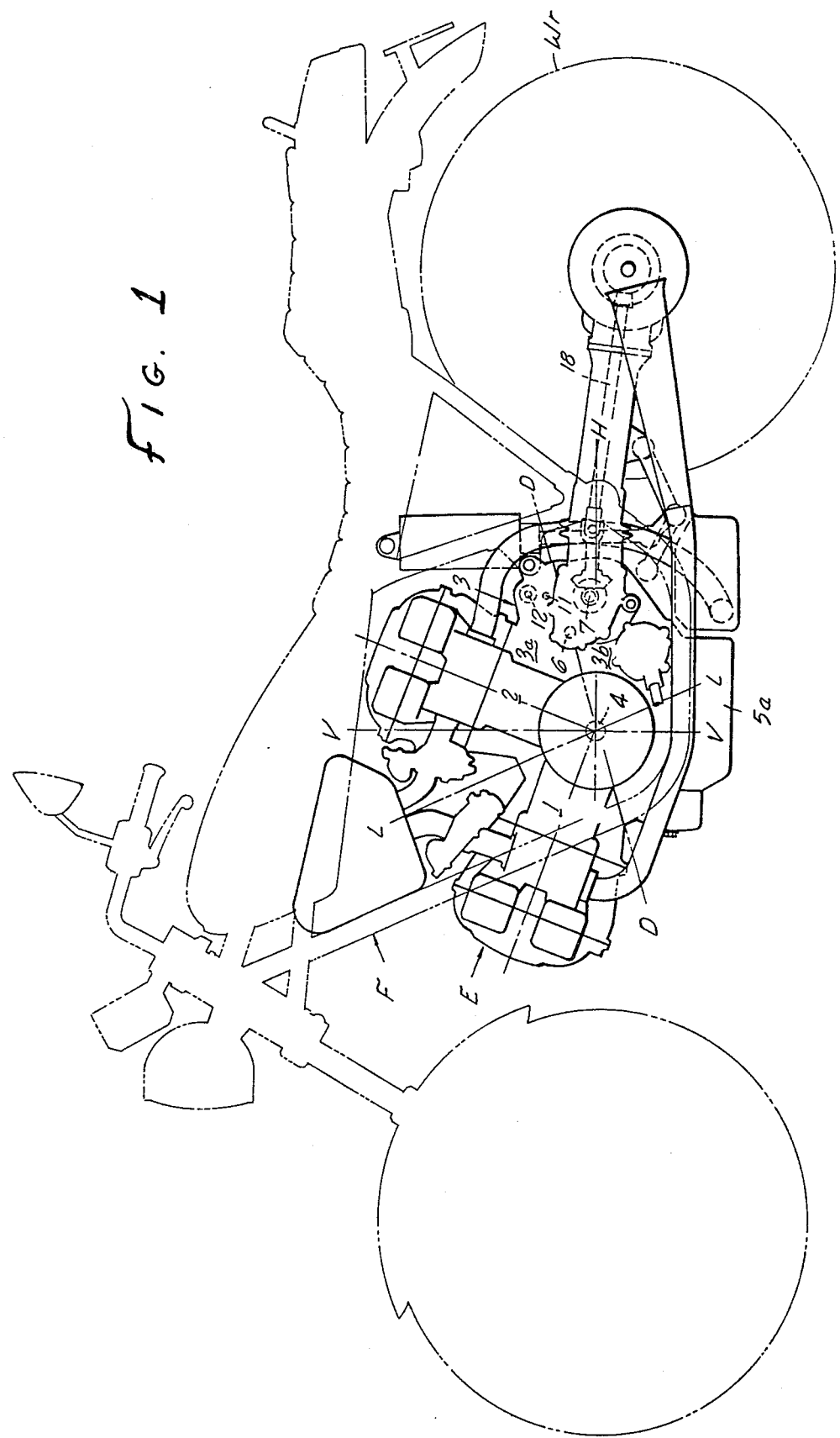
FIG. 1 is a side elevation of a motorcycle having a power unit comprising a preferred embodiment of this invention.
Figure 2:
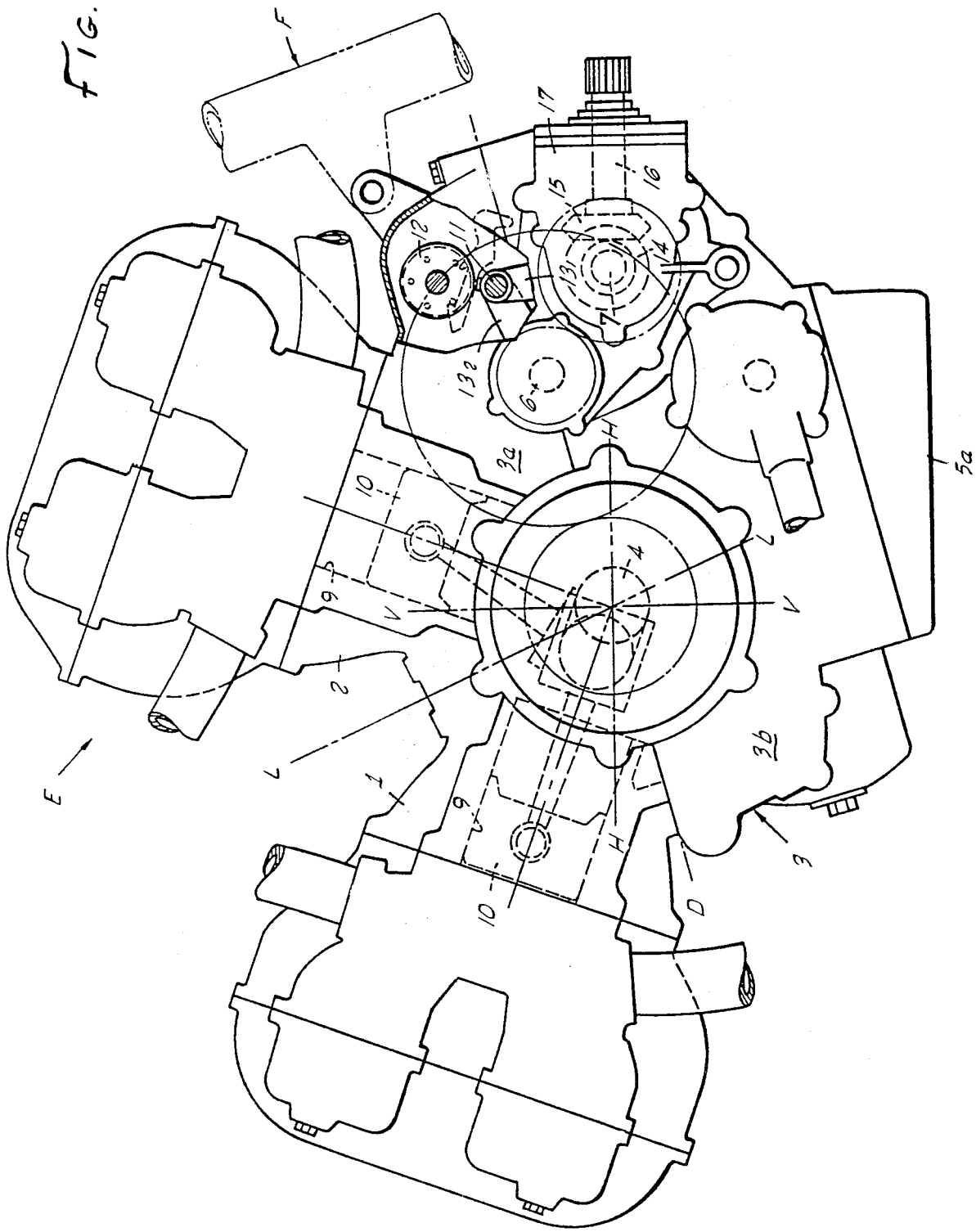
FIG. 2 is a side elevation of the power unit, partly in section.
Figure 3:
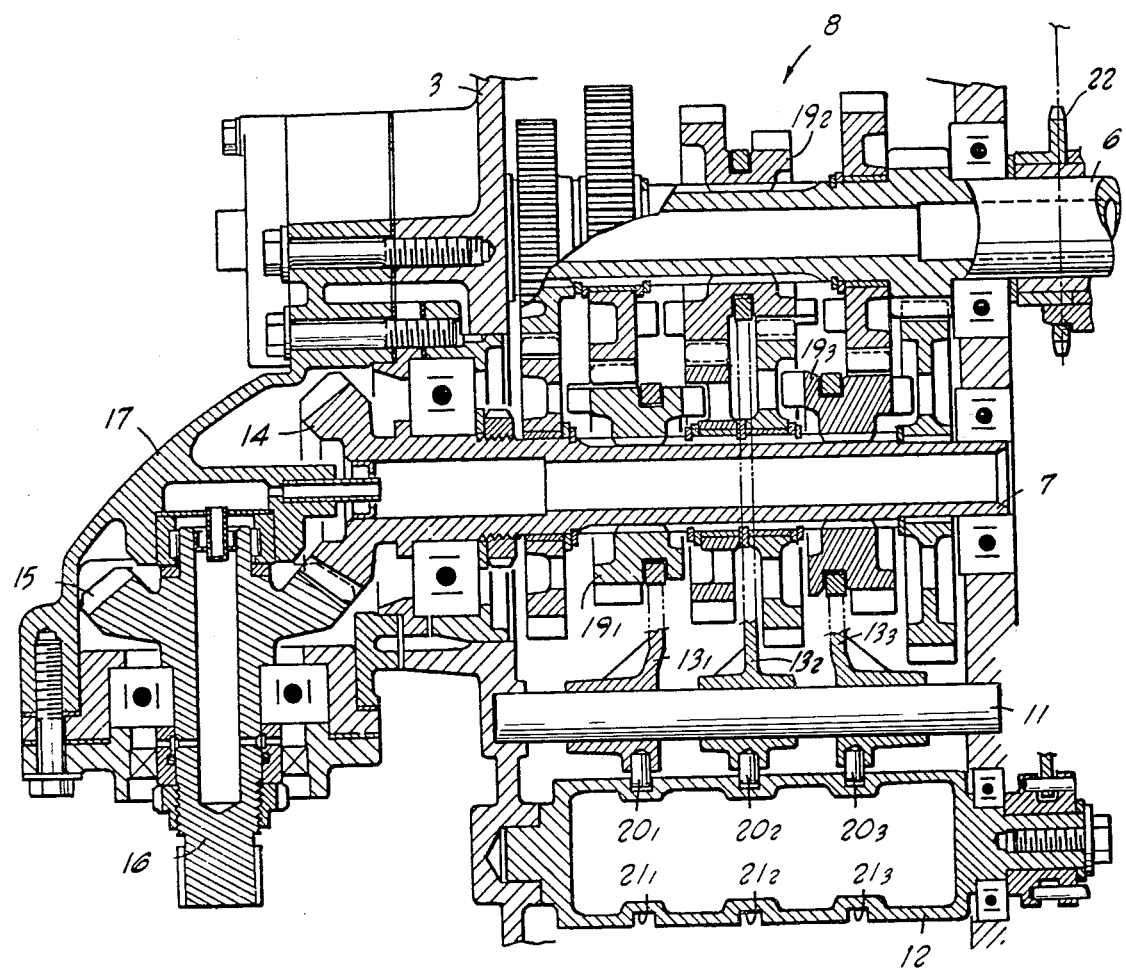
FIG. 3 is a sectional plan view of the reduction gear mechanism.
Figure 4:
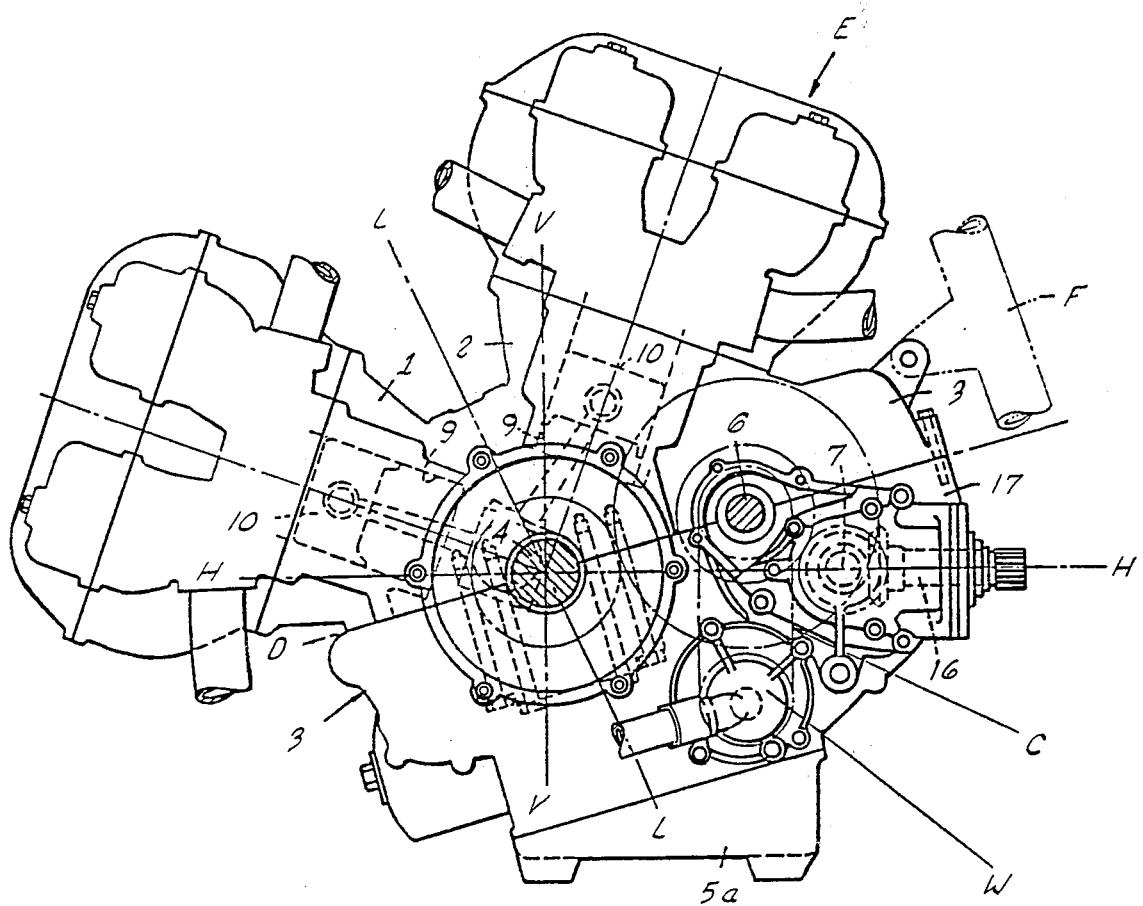
FIG. 4 is a view similar to FIG. 2 showing additional details.

The present invention will now be described in connection with one embodiment thereof with reference to the accompanying drawings.

A V-type multi-cylinder internal combustion engine E is mounted on the body frame F of a motorcycle in a transverse direction, i.e., in such a direction that its crankshaft 4 is perpendicular to the running direction of the motorcycle. The body of the aforementioned internal combustion engine E is provide with front and rear cylinder blocks 1 and 2 which are arranged in the form of a letter "V" in the longitudinal direction with respect to the body frame F. The crankcase 5 merging into those cylinder blocks 1 and 2 is integrated with the transmission case thereby to construct together a power unit case 3.

The front and rear cylinder blocks 1 and 2 are so arranged that their bisector L—L is inclined forward with respect to a vertical line V—V extending through the crankshaft 4. Moreover, the front and rear cylinder blocks 1 and 2 are respectively formed with customary cylinder bores 9, in each of which a piston 10 is slidably fitted.

The aforementioned power unit case 3 is vertically divided into upper and lower sections $3^a$ and $3^b$, the dividing plane D—D of which is inclined with respect to a horizontal plane H—H. The front and rear cylinder blocks 1 and 2 are formed integrally with the upper section $3^a$. To the opened lower side of the lower section $3^b$, on the other hand, there is intergrally fixed an oil pan $5^a$ which has its bottom extending substantially in parallel with the supporting surface on which the motorcycle rests.

In the power unit case 3, there is accommodated a drum actuated type of gear reduction mechanism for providing association between the crankshaft 4 and a rear wheel Wr. This mechanism includes a main shaft 6 associated with the crankshaft 4, a counter shaft 7 associated with the rear wheel Wr, a reduction gear mechanism 8 for providing association and connection between the main shaft 6 and the counter shaft 7, a guide shaft 11 for the shift forks $13_1$, $13_2$ and $13_3$ for shifting the reduction gear mechanism 8 and a shift drum 12 for actuating the shift forks $13_1$, $13_2$ and $13_3$. A water-pump W, which is located below the mainshaft 6 and countershaft 7, is driven by a chain C from a sprocket 22 on the mainshaft 6.

The crankshaft and main shaft 4 and 6 as thus far described are rotatably journaled on the dividing plane D—D of the upper and lower sections $3^a$ and $3^b$ of the power unit case 3. On the lower section $3^b$, there is rotatably journaled the aforementioned counter shaft 7. On one end of this counter shaft 7, there is mounted a drive bevel gear 14 which is in meshing engagement with a driven bevel gear 15 mounted on one end of the final shaft 16. This final shaft 16 is rotatably supported on a bevel gear case 17, which is secured to one side of the power unit case 3, and is associated with the rear wheel Wr through a propeller shaft 18.

The guide shaft 11 and shift drum 12 as thus far described are rotatably supported on the upper section $3^a$ above the counter shaft 7. On the guide shaft 11, there are axially slidable the plural shift forks $13_1$, $13_2$ and $13_3$ which have their fingers engaging with shift gears $19_1$, $19_2$ and $19_3$ of the reduction gear mechanism 8, respectively. At the shift forks $13_1$, $13_2$ and $13_3$, moreover, there are respectively anchored guide pins $20_1$, $20_2$ and $20_3$, which extend into the lead grooves $21_1$, $21_2$ and $21_3$ formed on the outer circumference of the shift drum 12. As a result, the shift forks $13_1$, $13_2$ and $13_3$ have their sliding motions controlled along the guide shaft 11 by the revolutions of the shift drum so that the shifting operations of the reduction gear mechanism may be performed. Incidentially, the shifting mechanism interposed between the guide shaft 11 and the shift drum 12 is of such a well-known construction that its detailed explanation is omitted here.

When the internal combustion engine E is run, the revolutions of the crankshaft 4 are transmitted through the main shaft 6, the reduction gear mechanism 8 and the counter shaft 7 to the final shaft 16 and further through the propeller shaft 18 to the rear wheel Wr. Within the power unit case 3, the lubricant, which has lubricated the shifting mechanism including the shift drum 12, guide shaft 11, and shift forks $13_1$, $13_2$ and $13_3$ passes through the shift forks $13_1$, $13_2$ and $13_3$ into the shift grooves of the shift gear $19_1$, $19_2$ and $19_3$ so that it can ensure excellent lubrication between these parts.

As has been described hereinbefore, according to the present invention, in a structure having the drum type reduction mechanism accommodated in the power unit case 3 integrating the crankcase and transmission case, the main shaft 6 and the counter shaft 7 are supported on the dividing plane of the upper and lower sections $3^a$ and $3^b$ of the aforementioned power unit case 3 and on the lower section $3^b$, respectively. The guide shaft 11 of the shift forks $13_1$, $13_2$ and $13_3$ and the shift drum 12 are supported on the upper section $3^a$. As a result, the aforementioned power unit case 3 can have its length reduced not only so that the mounting of the internal combustion engine E on the body frame F can be facilitated within a predetermined wheel base of the motorcycle, but also so that allowance can be provided for the layout and mounting of other parts.

Above the main shaft 6 and the counter shaft 7, the guide shaft 11 of the shift forks $13_1$, $13_2$ and $13_3$ and the shift drum are supported on the upper case $3_a$. As a result, the lubricant having lubricated them passes through the shift forks $13_1$, $13_2$ and $13_3$ onto the shift gears $19_1$, $19_2$ and $19_3$ of the reduction gear mechanism 8. This ensures excellent lubrication between the shift forks $13_1$, $13_2$ and $13_3$ and the shift gears $19_1$, $19_2$ and $19_3$ which frequently move relative to each other.

Since the counter shaft 7 is supported on the lower section $3^b$, a relatively high load to be exerted upon that counter shaft 7 can be borne without fail by the lower section $3^b$. Moreover, since the main shaft 6 bears a lower load than the counter shaft 7, it is arranged on the dividing plane of the upper and lower cases $3^a$ and $3^b$, and the assembly procedure for the main shaft is thereby improved.

Having fully described my invention, it is to be understood that it is not to be limited to the details set forth, but is of the full scope of the appended claims.

I claim:

1. Power unit apparatus for a motorcycle including an internal combustion engine having a crankshaft, and having a power unit case combining a crankcase and a transmission case, comprising, in combination: a main shaft associated with the crankcase, a counter shaft adapted to drive a rear wheel of the motorcycle, a reduction gear mechanism for driving said counter shaft from said main shaft, said mechanism having a guide shaft supporting shift forks for shifting said mechanism, a shift drum for actuating said shift forks, said power unit case being divided into an upper section and a lower section so that said crankshaft and said main shaft are supported on the dividing plane between said sections, said guide shaft and said shift drum being supported on said upper section above said main shaft and said counter shaft, said counter shaft being supported on said lower section.

2. The combination set forth in claim 1 in which a coolant pump for the engine is mounted on said lower section and is driven from said main shaft.

3. A power unit apparatus as claimed in claim 1 in which the engine is multicylinder and of the V-type in which the crankshaft is transverse to the running direction of the motorcycle.

* * * * *